US011485076B2

(12) United States Patent
Zitelli et al.

(10) Patent No.: US 11,485,076 B2
(45) Date of Patent: Nov. 1, 2022

(54) MODELLING HEAD FOR A THREE-DIMENSIONAL PRINTING MACHINE AND PROCESS FOR CALIBRATING SAID MODELLING HEAD

(71) Applicant: SISMA S.p.A., Piovene Rocchette (IT)

(72) Inventors: Gianni Zitelli, Piovene Rocchette (IT); Federico Iacovella, Piovene Rocchette (IT)

(73) Assignee: SISMA S.p.A., Piovene Rocchette (IT)

( * ) Notice: Subject to any disclaimer, the term of this patent is extended or adjusted under 35 U.S.C. 154(b) by 0 days.

(21) Appl. No.: 17/259,912

(22) PCT Filed: Jul. 12, 2019

(86) PCT No.: PCT/IB2019/055958
§ 371 (c)(1),
(2) Date: Jan. 12, 2021

(87) PCT Pub. No.: WO2020/012429
PCT Pub. Date: Jan. 16, 2020

(65) Prior Publication Data
US 2021/0291444 A1    Sep. 23, 2021

(30) Foreign Application Priority Data

Jul. 13, 2018   (IT) .................... 102018000007174

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/124* (2017.08); *B29C 64/232* (2017.08);
(Continued)

(58) Field of Classification Search
CPC ........................... B29C 64/209; B29C 64/232
See application file for complete search history.

(56) References Cited

U.S. PATENT DOCUMENTS

2014/0242208 A1* 8/2014 Elsworthy ............. B29C 64/112
425/375
2015/0328841 A1   11/2015 Ding
(Continued)

FOREIGN PATENT DOCUMENTS

WO    WO 2017/125883 A1    7/2017

OTHER PUBLICATIONS

International Search Report and Written Opinion of the International Searching Authority for International Application No. PCT/IB2019/055958, dated Oct. 21, 2019, in 9 pages.

*Primary Examiner* — Timothy Kennedy
(74) *Attorney, Agent, or Firm* — Knobbe, Martens, Olson & Bear, LLP (57) ABSTRACT

A modelling head for a three-dimensional printing machine, comprising a base body having a work surface suitable for enabling the formation and adhesion of an object, a support device connected to said base body and a movement member for moving said base body, wherein the support device is adjustable so as to change the orientation of the base body and in particular of the work surface relative to the movement member and is configured to switch, in an automated manner, from an unlocked configuration, in which it allows a change in the orientation of the base body relative to the movement member, and a locked configuration in which it locks the configuration assumed by the base body relative to the movement member.

17 Claims, 8 Drawing Sheets

(51) Int. Cl.
  *B29C 64/264* (2017.01)
  *B29C 64/124* (2017.01)
  *B29C 64/232* (2017.01)
  *B29C 64/245* (2017.01)

(52) U.S. Cl.
  CPC .......... *B29C 64/245* (2017.08); *B29C 64/264* (2017.08); *B33Y 30/00* (2014.12)

(56) References Cited

U.S. PATENT DOCUMENTS

2016/0236408 A1* 8/2016 Wolf ..................... B29C 64/106
2017/0173881 A1   6/2017 Dachs, II et al.
2017/0259506 A1* 9/2017 Ho ...................... B29C 37/0025

* cited by examiner

MODELLING HEAD FOR A THREE-DIMENSIONAL PRINTING MACHINE AND PROCESS FOR CALIBRATING SAID MODELLING HEAD

CROSS-REFERENCE TO RELATED APPLICATIONS

This application is the U.S. National Phase under 35 U.S.C. § 371 of International Application PCT/IB2019/055958, filed Jul. 12, 2019, which claims priority to IT Application No. 102018000007174, filed Jul. 13, 2018, the entire contents of each of which are incorporated by reference herein and made a part of this specification.

SUMMARY

The present invention relates to a modelling head for a three-dimensional printing machine. The invention also relates to a process for calibrating the above-mentioned modelling head.

In greater detail, the present invention falls within the field of so-called "3D printing", or "stereolithography", which, as is well known, is a technique that enables three-dimensional objects to be produced by solidifying and superimposing a plurality of layers obtained from a liquid resin susceptible of solidifying under the action of an external stimulation.

The three-dimensional printing technique has specific and effective use in the production of prototypes for various types of industries, from the plastics to the gold-working sector.

In accordance with the prior art, a three-dimensional printing machine comprises a tank for containing the liquid resin and a modelling head endowed with a work surface, generally flat, adapted to support the solidified layers of the three-dimensional object to be produced. Furthermore, there is a resin stimulation device consisting of an irradiation source, typically a laser emitter or a light projector (in technical jargon called DLP, Digital Light Processing), able to selectively irradiate the layer of liquid resin adjacent to the bottom of the tank, so as to solidify it. In greater detail, each layer of the object is obtained by selectively stimulating the resin in such a way as to solidify it in the points making up a corresponding section of the object to be produced.

In accordance with a very widely used known technique, the irradiation source is positioned below the tank, the bottom of which is suitably transparent to the radiation emitted by the source itself. In this case, the three-dimensional printing process requires first of all that the modelling head be disposed with its working surface turned downwards, so as to be facing the bottom of the tank, and positioned at a distance from the bottom of the tank which is equal to the thickness of the first layer to be solidified. Subsequently, the irradiation source selectively irradiates the layer of liquid resin adjacent to the bottom of the tank so as to solidify it. In greater detail, the modelling head is configured so that the solidified layer adheres to it, while the bottom of the tank, by contrast, has a coating that reduces such adhesion. For the formation of each subsequent layer, the modelling head is moved away from the bottom of the tank, each time by an amount equal to the thickness of the layer to be produced, so as to restore the thickness of liquid resin necessary for processing the next layer. At the end of the multilayer production, the modelling head is raised, bringing the product out of the resin, and the product is retrieved by separation from the work surface.

In this known solution, the thickness of each layer is defined by the portion of liquid resin delimited below by the bottom of the tank and above by the work surface of the modelling head (in the case of the first layer) or of the last layer produced.

It follows that the production of layers having a uniform thickness, an essential characteristic for the regularity of the products to be produced, requires that the work surface of the modelling head be perfectly aligned with the bottom of the tank containing the resin and is positioned at a precise distance (generally equal to the thickness of the first layer to be printed), generically between 10 and 200 microns, with a maximum error in terms of unalignment no greater than 5 microns.

At the present state of the art, this parallelism is managed by means of compensation systems of a manual type which are very laborious to implement and introduce levels of precision that are insufficient in relation to the required standard.

In accordance with the prior art, the document US2017/0173881 is known; it shows a three-dimensional printer provided with a selectively lockable support.

The technical task of the present invention is to provide a modelling head for a three-dimensional printing machine that overcomes the aforesaid drawbacks of the prior art.

In particular, it is an object of the invention to provide a modelling head for a three-dimensional printing machine, as well as a process for the calibration thereof, which enables a high precision of production, in particular in terms of tolerances of the thickness of the layers produced.

It is a further object of the invention to provide a modelling head for a three-dimensional printing machine, as well as a process for the calibration thereof, which simplifies the preliminary adjustment procedures.

The stated technical task and the specified objects are substantially reached by a modelling head for a three-dimensional printing machine, as well as a process for the calibration thereof, comprising the technical features disclosed in the independent claims and/or in one or more of the dependent claims. The dependent claims correspond to further embodiments of the modelling head according to the present invention.

Additional features and advantages of the present invention will become more apparent from the approximate, and thus non-limiting, description of a preferred, but non-exclusive, embodiment of a modelling head for a three-dimensional printing machine, as well as a process for the calibration thereof, as illustrated in the appended drawings, in which:

DETAILED DESCRIPTION

With reference to the figures, the number 10 denotes in its entirety a modelling head for a three-dimensional printing machine.

Figure 1:
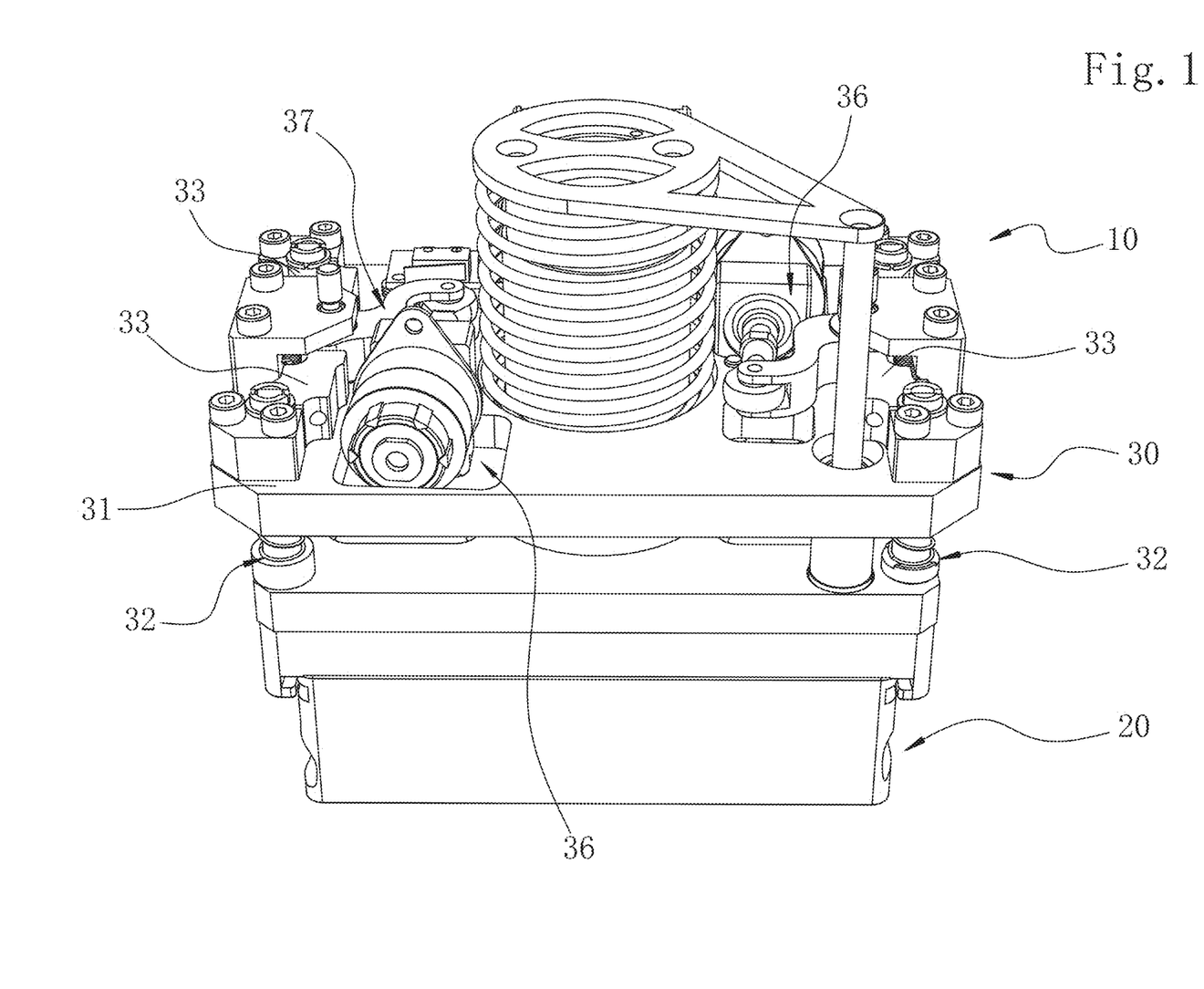
FIG. 1 shows a modelling head in accordance with the present invention.
Figure 2:
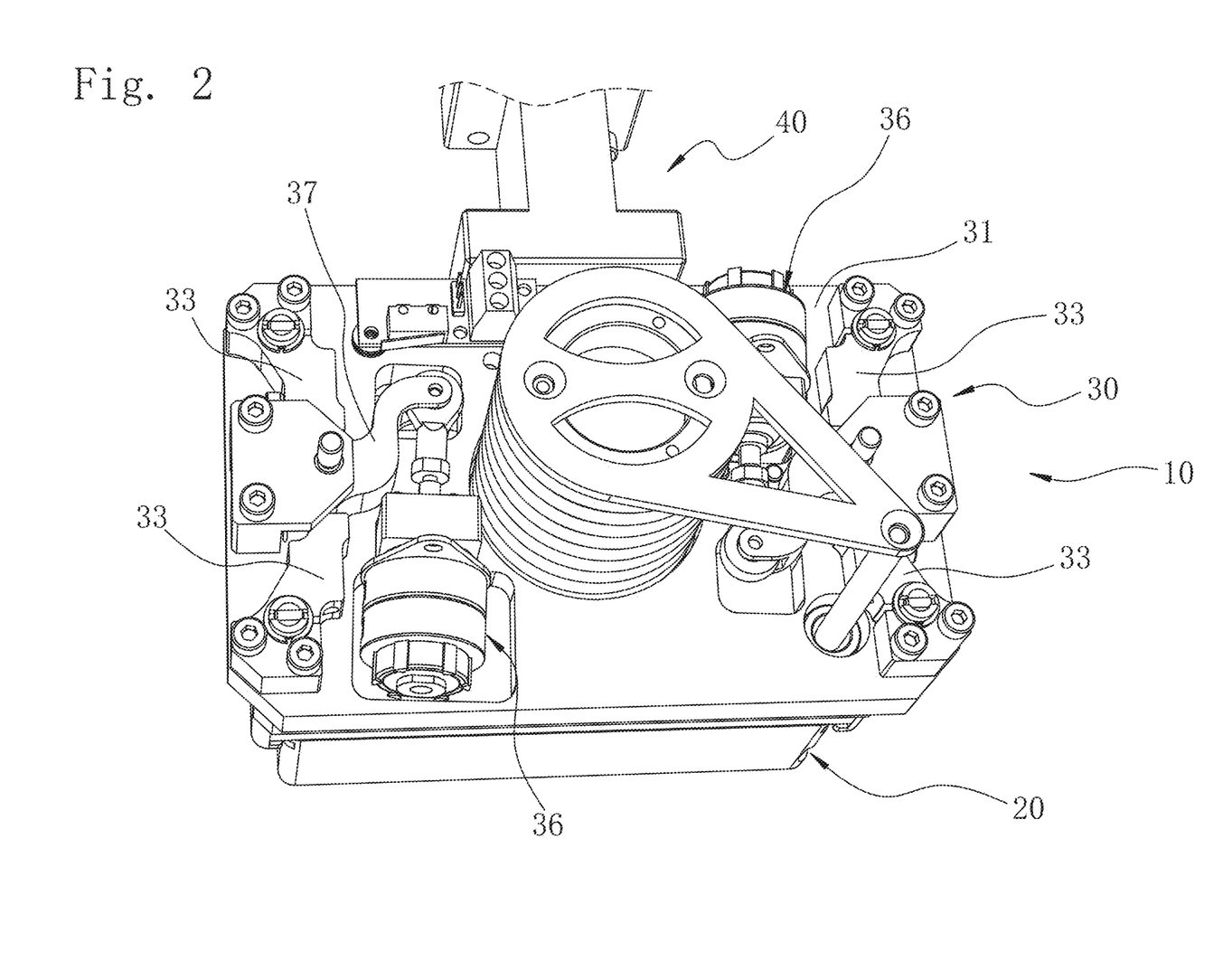
FIG. 2 shows the modelling head of FIG. 1 according to a different angle.
Figure 4:
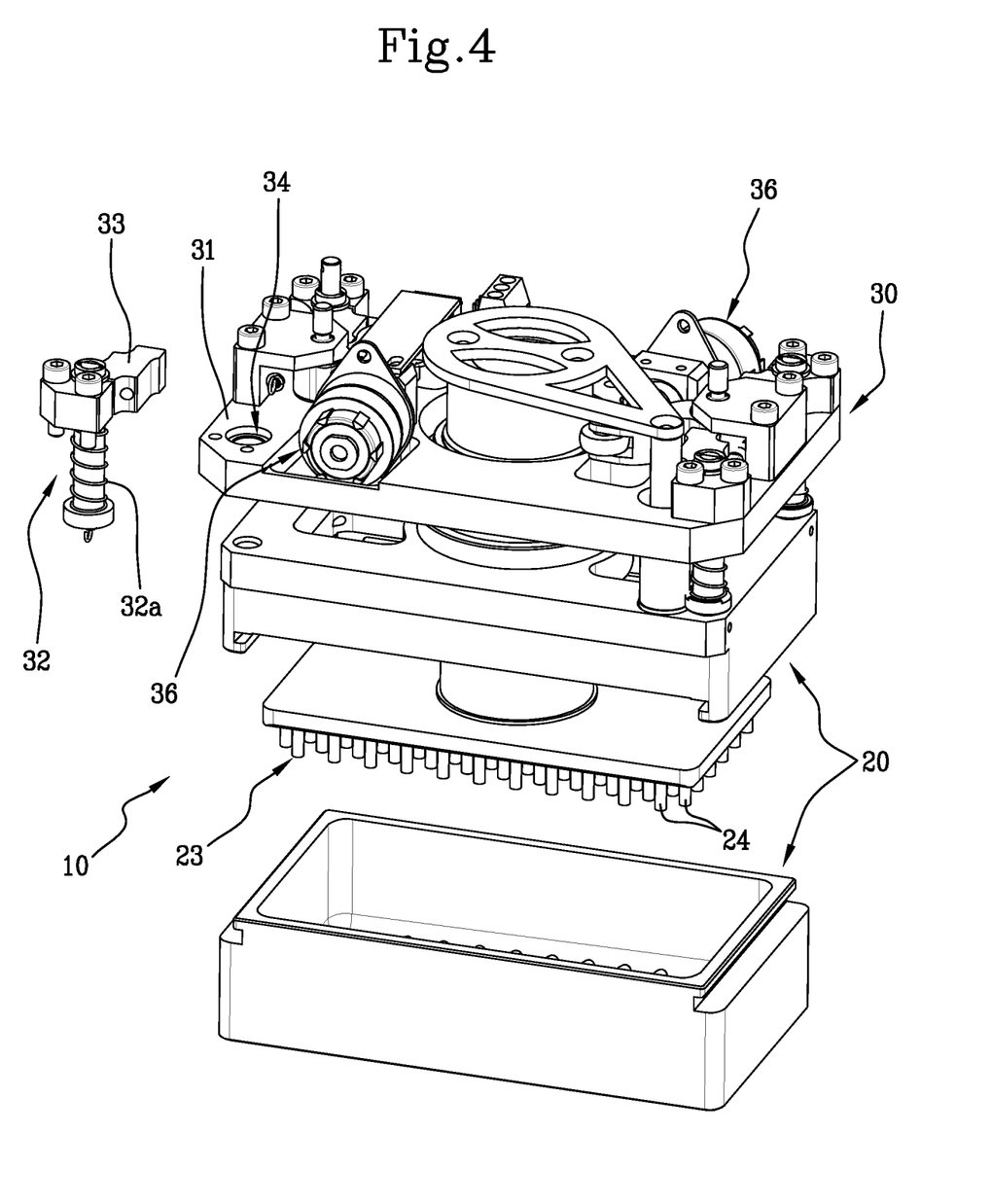
FIG. 4 shows a partially exploded view of the modelling head illustrated in FIG. 1.

With particular reference to FIGS. 1, 2 and 4, the modelling head 10 comprises a base body 20, connected to which there is a support device 30 connected in turn to a movement member 40 (partially visible in FIG. 2) with the function of operatively moving the base body 20 in a vertical direction.

In greater detail, the base body 20 is substantially box-shaped, internally hollow and provided on the bottom with a planar platform 21 defining a lower work surface 22, which defines a gripping zone for the first layer of a multilayer product to be produced.

As can be seen in FIG. 4, disposed inside the base body 20 there is an extractor body or plate 23 actuated by a respective independent actuator cooperating with the work surface 22 and having a profile adapted to penetrate the work surface 22 in one or more points to promote the detachment, from the work surface 22, of an object formed on and adherent to the latter. In greater detail, the extractor plate 23 is provided with projections 24 configured to pass through corresponding openings fashioned in the platform 21 in such a way as to protrude from the bottom of the latter and facilitate the detachment of the multilayer object once production has ended.

With reference to the support device 30 (which can be seen, for example, in FIG. 2), it comprises a support plate 31 and an adjustable means disposed so as to connect the support plate 31 with the base body 20 and configured to enable a change in the orientation of the base body 20, and in particular of the work surface 22, relative to the movement member 40. By virtue of such adjustable means, the support device 30 can switch in an automated manner (that is, a mechanised manner, hence by means of mechanical actuation and transmission systems) between an unlocked configuration, in which it enables a change in the orientation of the base body 20 relative to the movement member 40, and a locked configuration, in which it locks the orientation assumed by the base body 20 relative to the movement member 40. Such switching, by virtue of the mechanisation, takes place almost instantly, in particular by simultaneous actuation of the jaws 33. The switching takes place, for example, on the user's command (pressing of a calibration start and/or stop button) or as part of an entirely automatic process, for example via a routine actuated by a processing and control unit belonging to the three-dimensional printing machine.

In the illustrated embodiment, the adjustable means comprises a plurality of rods 32 connected to the base body 20 and, for each rod 32, a respective jaw 33 configured to assume a clamping configuration, corresponding to the aforementioned locked configuration of the support device 30 and in which it locks the respective rod 32 in position, and a release position, corresponding to said unlocked configuration of the support device 30 and in which it enables a longitudinal translation of the respective rod 32 in the respective jaw 33.

In order to enable the rods 32 to be guided, the plate 31 is provided with holes 34 (FIG. 4) inside which the rods 32 are slidingly housed and each of which is associated with a respective jaw 33 so as to enable or prevent the translation of the rod 32 through the hole 34.

In order to absorb any unalignments (or in any case changes in orientation) between the base body 20 and the movement member 40, each rod 32 is connected to the base body 20 in an adjustable and/or floating manner, thus in such a way that the rod 32 can change its inclination relative to the base body 20 and preferably also make a small transversal movement in the point where it joins the base body 20 and/or in the coupling between rod 32 and hole 34. Each rod 32 is preferably connected to the base body 20 by means of a spherical connection, in particular by means of a sphere-shaped end of the rod 32 inserted into a sphere-shaped housing fashioned on the base body 20.

Furthermore, each rod 32 is preferably associated with a respective opposing spring 32a (which can be seen, for example, in FIGS. 4 and 5) to keep the rod 32 pushed in an axial direction towards an end-of-stroke position of the rod. The opposing spring 32a is preferably a compression spring configured to maintain the base body 20 pushed away from the support device 30 and the movement member 40.

In the illustrated embodiment, four rods 32 and an equal number of jaws 33 are provided, but the number of rods and corresponding jaws could be any whatsoever (preferably a minimum number of three, a more isostatic support being optimisable with three rods).

Figure 3:
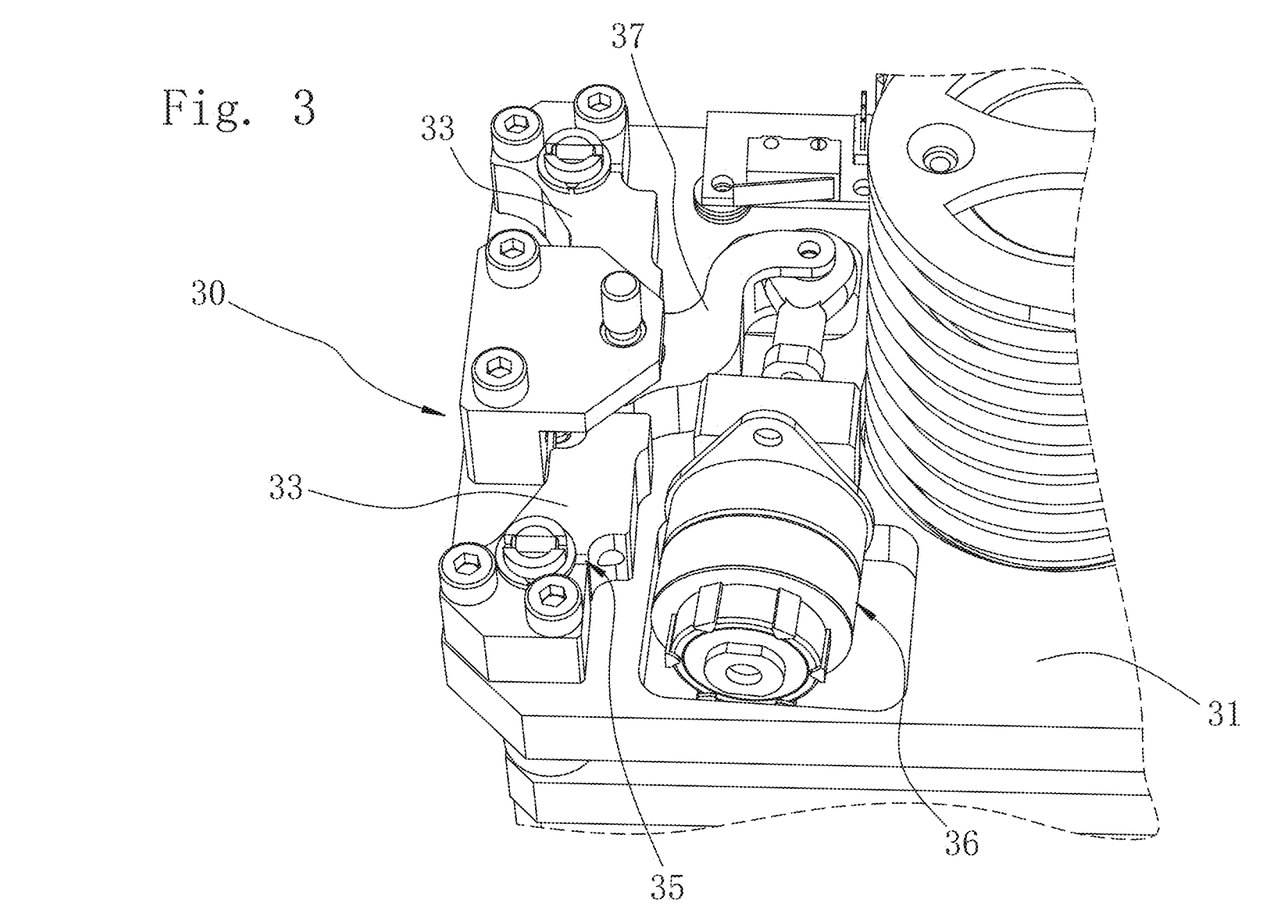
FIG. 3 shows an enlargement of a detail of the modelling head of FIG. 1.

The jaws 33 and the operating principle thereof can be seen in detail in FIGS. 2 and 3.

Figure 5:
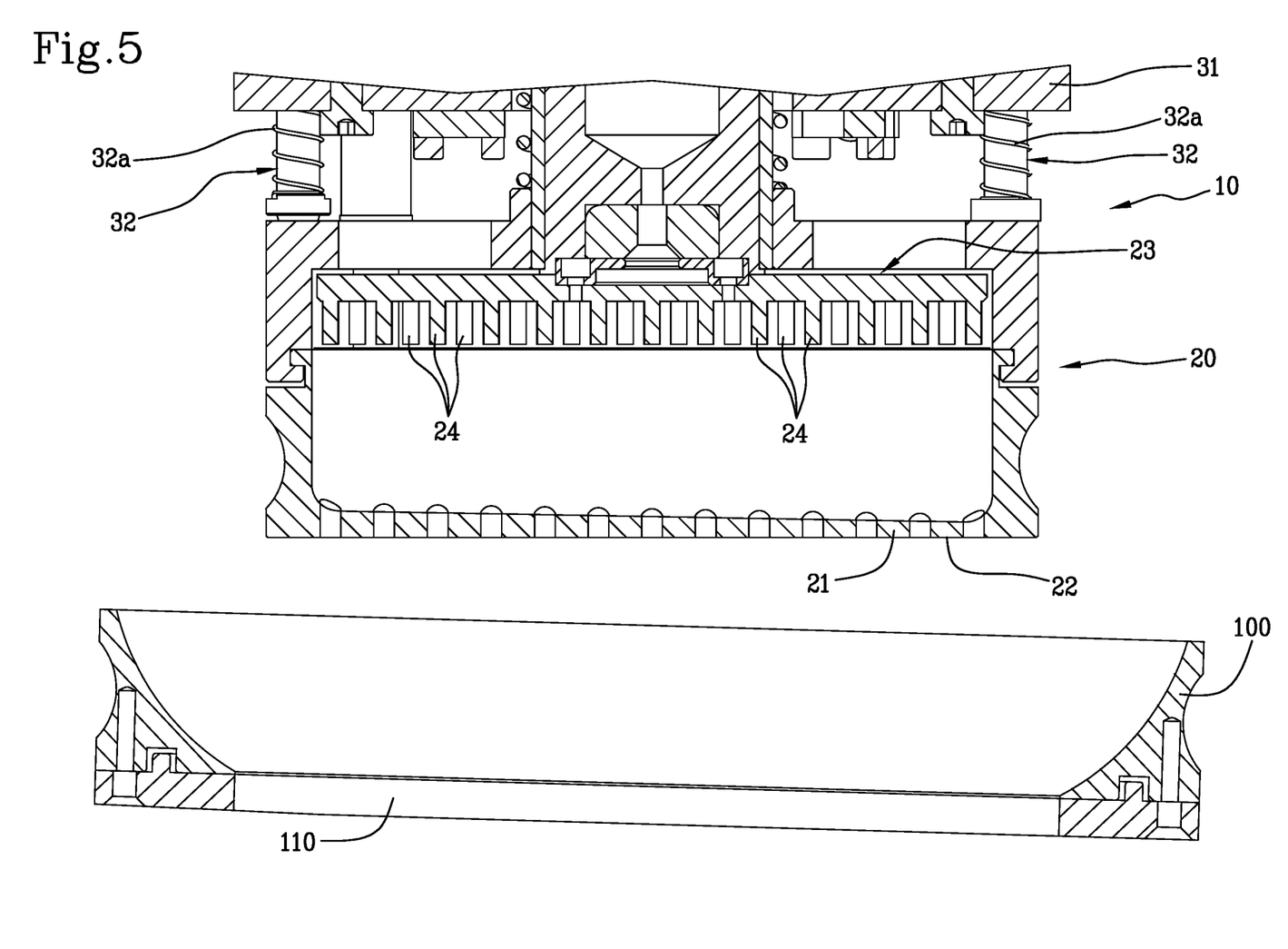
FIGS. 5-8 show the modelling head of FIG. 1 in a sequence of operating steps of the calibration process according to the invention.

In particular, each jaw 33 is defined by a member that is elastically deformable between the above-mentioned clamping and release configurations. In this embodiment, as can be seen in the exploded image in FIG. 4, each jaw 33 has a seat (not visible in the appended figures) for the passage of the respective rod 32 and in particular approximating, but larger than, the cross-section size of the rod 32 in the release configuration so as to enable the free translation of the rod 32 in the jaw 33 when the latter is not clamped. With reference to FIG. 5, the seat is open at the side, that is, it has a slot 35 which extends from a side portion of the seat to an outer profile of the jaw 33 to enable an elastic deformation of the jaw 33 at the slot 35 so as to enable the clamping of the jaw 33 on the respective rod 32 in the clamping configuration of the jaw 33.

In this embodiment, each jaw 33 is made up of a single piece, preferably metallic.

Alternatively, instead of being defined by elastically deformable one-piece members, the jaws 33 can each be defined by articulated members delimiting between them a seat for the passage of the respective rod 32 so as to clamp or release the rod 32 itself upon command.

Advantageously, the jaws 33 are associated with respective actuators 36 (which can be seen, for example, in FIGS. 1, 2 and 4) configured to switch the jaws 33 between the respective clamping and release configurations. Each actuator 36 is preferably associated with a pair of jaws 33.

The actuator 36 is of a linear type, preferably a hydraulic or pneumatic piston or a screw/nut electromagnetic actuator.

As can be better seen in FIGS. 2 and 3, the actuator 36 acts on the respective jaws 33 by means of a respective cam transmission element 37. The transmission element 37 is pivoted onto the plate 31 so as to rotate as a result of the action of the respective actuator 36 and is configured to exert a pressure on both of the respective jaws 33 in the clamping direction during rotation about the respective pin. In other words, the transmission element 37 is eccentrically connected (relative to its pivot pin) to the actuator 36 and has a pair of cam surfaces each facing towards the respective jaw 33 and in sliding contact with the latter so as to produce a change in the compression on the jaw 33 following the rotation of the transmission member 37. In this manner, each actuator 36 performs a simultaneous clamping or release of two jaws 33 (even if, as previously mentioned, the inventive concept is applicable to a different number of actuators, thus for example an actuator for each jaw or a single actuator for all of the jaws).

With reference to the movement member 40, it comprises a mechanical lift (for example hydraulic or mechanical, of the high precision type) having a mobile portion fixed to the support device 30 and in particular to the plate 31.

The movement member 40 can for example be of the type described in patent application EP3205484 in the Applicant's name, on which three modelling heads are arranged, angularly spaced apart from each other by 120°.

FIGS. 5-8 illustrate a sequence of operations relating to a process for calibrating the modelling head 10 according to the invention.

FIG. 5 shows the modelling head 10 in a position facing a tank 100 for containing a resin and in accordance with a generic orientation that is unaligned relative to the bottom 110 of the tank 100.

Figure 6:
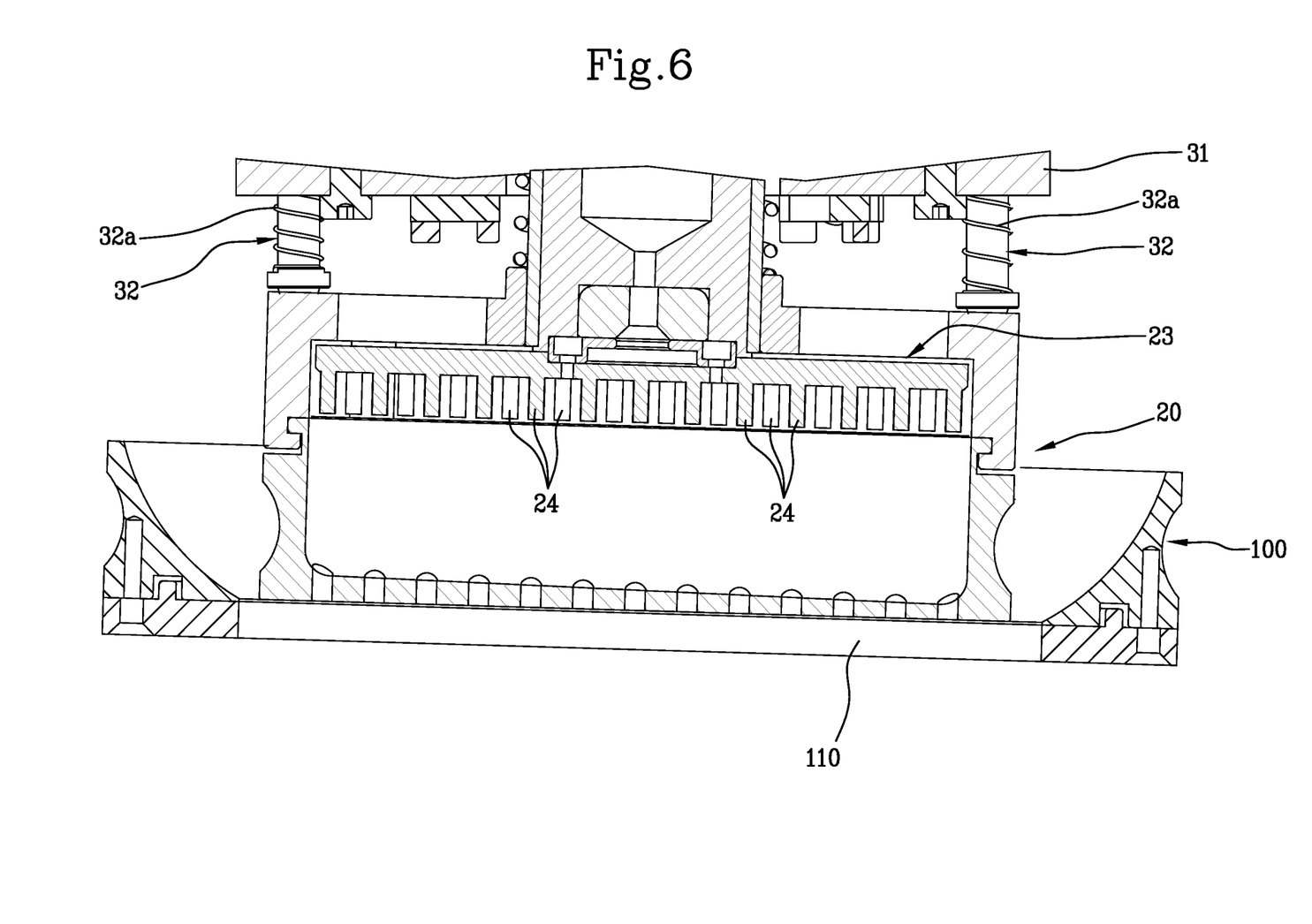

FIG. 6 shows the subsequent step of contact of the modelling head 10 with the bottom 110 of the tank 100, in which the work surface 22 is in alignment (superposition) with the bottom 110 of the tank 100 thanks to the absorption of the previous unalignment enabled by the rods 32 (whose strokes in the respective holes 34 are different so as to compensate for the change in inclination).

Figure 7:
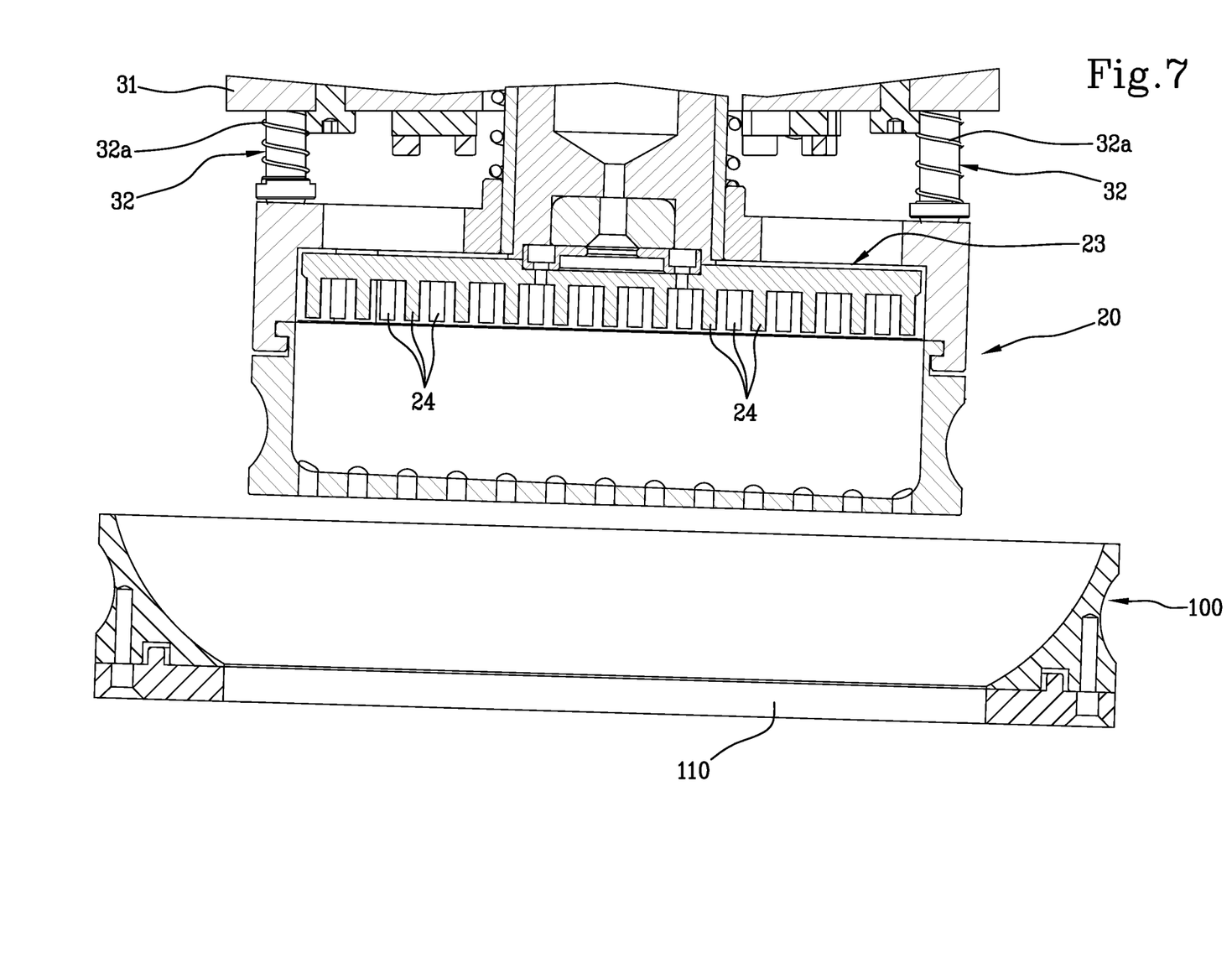

FIG. 7 shows a subsequent step of raising the modelling head 10, for example at the end of the production of the multilayer object (not shown in the figures).

Figure 8:
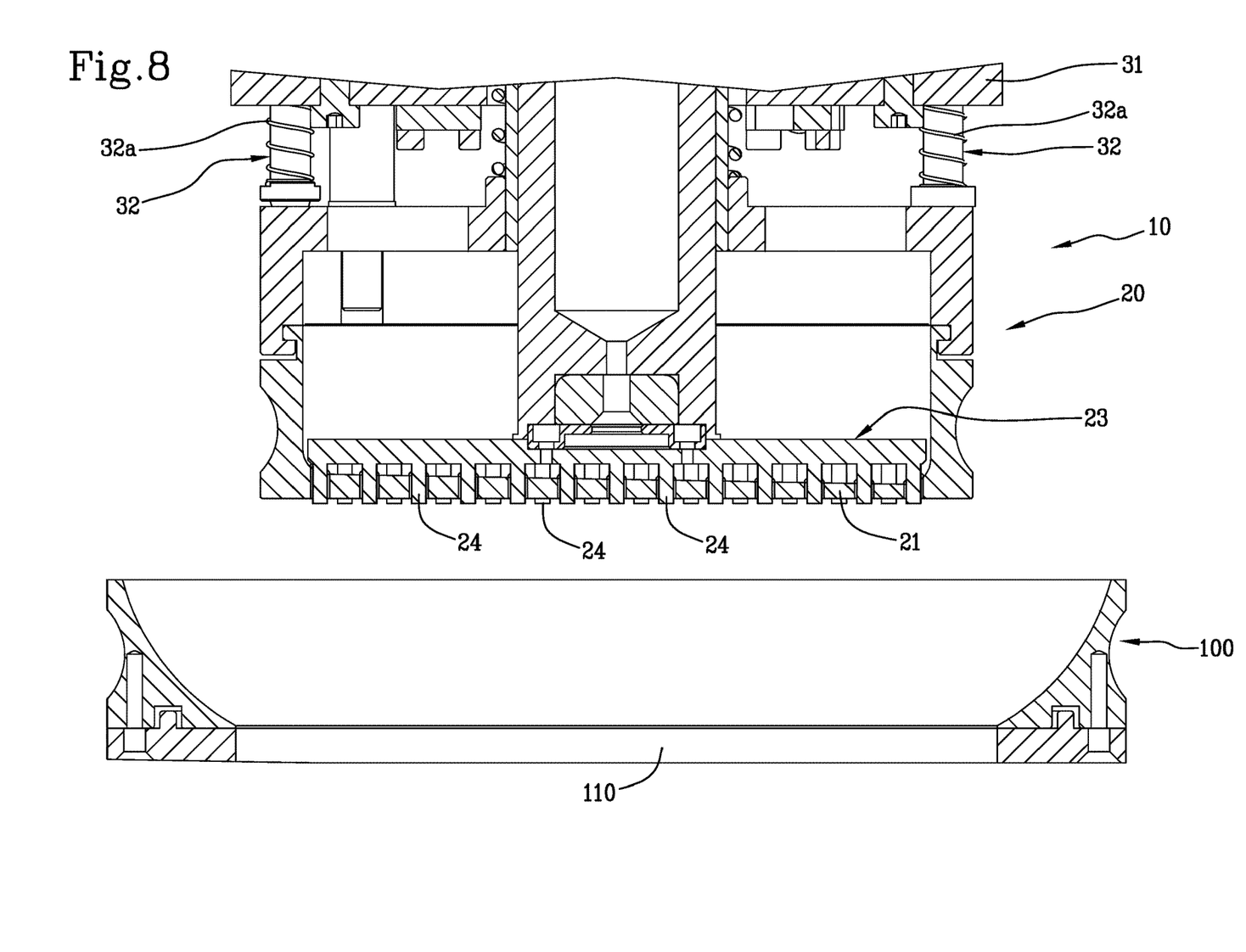

FIG. 8 shows a terminal step of the production process, wherein the extractor body 23 is lowered, penetrating the platform 21 and thus enabling the detachment of the multilayer object previously adhering to the work surface 22.

The present invention achieves the proposed objects, overcoming the drawbacks complained of in the prior art.

In particular, the invention makes it possible to adjust, in a completely automatic manner, the inclination of the platform of the modelling head, and in particular of the work surface, in perfect alignment (parallelism) with the bottom of the tank. This is enabled by the fact that the support device can assume an unlocked configuration in which, with the jaws released, a simple descent of the head and subsequent contact of the platform with the bottom of the tank brings about an auto-adaptation of the inclination of the platform. Subsequently, the automatic clamping of the rods by means of the jaws enables the inclination assumed by the platform to be immobilised; it can remain unchanged throughout the whole process of production the multilayer object.

The process is clearly endowed with high precision and rapidity of execution, as it is totally automatic without the need for manual adjustment interventions.

Furthermore, the use of the modelling head according to the invention simultaneously ensures the determination of the absolute position of the work surface, the latter being inevitably at the mechanical zero of the bottom tank (which is to say in contact with the latter). In other words, the invention enables the so-called "machine zero" to be easily configured. Finally, the use of software capable of memorising the zero point of extraction makes it possible to have an absolute positioning for every printing routine, also in the event that the platform or bottom of the tank change in thickness.

What is claimed is:

1. A modelling head for a three-dimensional printing machine, comprising:
    a base body having a work surface suitable for enabling the formation and adhesion of an object;
    a support device connected to said base body; and
    a movement member connected to the support device and having the function of operatively moving said base body,
    wherein said support device is adjustable in such a way as to change the orientation of the base body, and in particular of said work surface, relative to the movement member and is configured to switch in an automated manner between an unlocked configuration, in which it enables a change in the orientation of the base body relative to the movement member, and a locked configuration, in which it locks the orientation assumed by the base body relative to the movement member,
    and wherein said adjustable support device comprises a plurality of rods connected to the base body and, for each rod, a respective jaw configured to assume a clamping configuration corresponding to said locked configuration of the adjustable support device and wherein it blocks in position the respective rod, and a release position corresponding to said unlocked configuration of the adjustable support device and wherein it enables a longitudinal translation of the respective rod in the respective jaw.

2. The modelling head according to claim 1, wherein said adjustable support device further comprises a support plate fixed to the movement member and provided with holes in which said rods are slidingly housed, each hole being associated with a respective jaw so as to enable or prevent the translation of the rod through the hole.

3. The modelling head according to claim 1, wherein each rod is connected to the base body in an adjustable and/or floating manner.

4. The modelling head according to claim 1, wherein said jaws are associated with one or more respective actuators configured to switch said jaws between the respective clamping and release configurations.

5. The modelling head according to claim 4, wherein said actuator is of a linear type, and acts upon at least one jaw (33) by means of a respective cam transmission element (37).

6. The modelling head according to claim 1, wherein each of said jaws is defined by a member and wherein each jaw has a seat for the passage of the respective rod, said seat being open at the side so as to enable a clamping of the jaw on the respective rod in the clamping configuration of the jaw.

7. The modelling head according to claim 1, wherein each rod is associated with a respective opposing spring so as to maintain said rod pushed in an axial direction towards an end-of-stroke position of said rod.

8. The modelling head according to claim 1, wherein said movement member comprises a mechanical lift having a mobile portion fixed to said support device.

9. The modelling head according to claim 1, further comprising an extractor body cooperating with said work surface and having a profile suitable for penetrating said work surface in one or more points so as to promote the detachment, from said work surface, of a formed object adhering to said work surface.

10. A three-dimensional printing machine, comprising;
    a tank containing or suitable for containing a solidifiable liquid and associated with an irradiation means; and
    a modelling head according to claim 1,
    wherein said movement member is configured to bring about a linear movement of the base body closer to and away from a bottom wall of said tank.

11. A process for calibrating a modelling head for a three-dimensional printing machine, comprising the steps of:
provide the modelling head, comprising:
a base body having a work surface suitable for enabling the formation and adhesion of an object;
a support device connected to said base body; and
a movement member connected to the support device and having the function of operatively moving said base body,
wherein said support device is adjustable in such a way as to change the orientation of the base body, and in particular of said work surface, relative to the movement member and is configured to switch in an automated manner between an unlocked configuration, in which it enables a change in the orientation of the base body relative to the movement member, and a locked configuration, in which it locks the orientation assumed by the base body relative to the movement member,
and wherein said adjustable support device comprises a plurality of rods connected to the base body and, for each rod, a respective jaw configured to assume a clamping configuration corresponding to said locked configuration of the adjustable support device and wherein it blocks in position the respective rod, and a release position corresponding to said unlocked configuration of the adjustable support device and wherein it enables a longitudinal translation of the respective rod in the respective jaw;
setting said modelling head with the work surface disposed in a position facing a tank containing or suitable for containing a liquid for three-dimensional modelling;
bringing about a switching of said support device into the unlocked configuration;
bringing the modelling head closer to the bottom of the tank until achieving contact with alignment of the work surface with the bottom of the tank;
switching said support device into the locked configuration; and
moving the modelling head away from the bottom of the tank in order to be able to prepare the multilayer product of a three-dimensional model by irradiation of the liquid interposed between the bottom of the tank and said work surface.

12. The modelling head according to claim 3, wherein each rod is connected to the base body in the adjustable and/or floating manner by means of a spherical connection, so as to absorb changes in the inclination of the work surface relative to the movement member.

13. The modelling head according to claim 4, wherein said jaws are associated in pairs with a same actuator.

14. The modelling head according to claim 5, wherein said actuator is of the linear type comprising a hydraulic or pneumatic piston or a screw/nut electromagnetic actuator.

15. The modelling head according to claim 6, wherein each of said jaws is defined by the member being one-piece, which is elastically deformable between said clamping and release configurations.

16. The modelling head according to claim 7, wherein said opposing spring comprises a compression spring configured to maintain the base body pushed away from the support device.

17. The modelling head according to claim 8, wherein said mobile portion is fixed to a support plate fixed to the movement member.

* * * * *